United States Patent
Richardson et al.

(12)

(10) Patent No.: US 6,665,942 B2
(45) Date of Patent: Dec. 23, 2003

(54) PLANT PROTECTOR

(75) Inventors: Andrew Richardson, Gilesgate (GB); Michael Wilson, Crook (GB)

(73) Assignee: Black & Decker Inc., Newark, DE (US)

(*) Notice: Subject to any disclaimer, the term of this patent is extended or adjusted under 35 U.S.C. 154(b) by 51 days.

(21) Appl. No.: 09/997,319

(22) Filed: Nov. 28, 2001

(65) Prior Publication Data

US 2002/0100267 A1 Aug. 1, 2002

(30) Foreign Application Priority Data

Nov. 29, 2000 (GB) .............................................. 0029016
Dec. 14, 2000 (GB) .............................................. 0030457

(51) Int. Cl.[7] ........................ A01D 34/416; B26B 29/00
(52) U.S. Cl. ............................. 30/276; 403/62; 403/83; 403/84; 403/105; 215/321; 220/787; 30/286
(58) Field of Search ........................ 30/276, 286, 289, 30/293, 347, 371; 56/12.7, 295; 172/13, 14; D8/8; 403/62, 83, 84, 104, 105, 106, 107; 251/317, 320, 321, 355; 220/323, 324, 787

(56) References Cited

U.S. PATENT DOCUMENTS

| | | | | |
|---|---|---|---|---|
| 879,048 A | * | 2/1908 | Hibbler | ........................ 403/84 |
| 1,280,271 A | * | 10/1918 | Moll | ........................... 403/83 |
| 3,590,464 A | * | 7/1971 | Wildi | |

(List continued on next page.)

FOREIGN PATENT DOCUMENTS

| EP | 0 568 896 A2 * | 4/1993 |
|---|---|---|
| EP | 0 893 206 A1 | 1/1999 |
| WO | WO 99/05899 | 2/1999 |

Primary Examiner—Hwei-Siu Payer
(74) Attorney, Agent, or Firm—Harness, Dickey & Pierce, P.L.C.

(57) ABSTRACT

A string trimmer comprising an elongate shaft and a cutting head rotatably mounted on one end of the shaft. A cutting member which extends from the cutting head. An attachment is pivotally mounted on the string trimmer by at least one pivot mechanism, wherein the pivot mechanism comprises a latching mechanism about which the attachment is capable of latchably rotating relative to the string trimmer. The attachment is a barrier which is capable of being used by an operator to move vegetation away from a path swept out by the cutting member.

45 Claims, 10 Drawing Sheets

U.S. PATENT DOCUMENTS

| | | |
|---|---|---|
| 4,035,912 A | 7/1977 | Ballas et al. |
| 4,049,059 A | 9/1977 | Weibling |
| 4,052,789 A | 10/1977 | Ballas, Sr. |
| 4,068,376 A | 1/1978 | Briar |
| 4,161,820 A | 7/1979 | Moore |
| 4,167,812 A | 9/1979 | Moore |
| 4,183,138 A | 1/1980 | Mitchell et al. |
| 4,189,833 A | 2/1980 | Kwater |
| 4,200,978 A | 5/1980 | Irelan et al. |
| 4,211,004 A | 7/1980 | Woods |
| 4,237,610 A | 12/1980 | Bradus et al. |
| 4,284,172 A * | 8/1981 | Cohen .......................... 403/84 |
| 4,362,074 A | 12/1982 | Kwater |
| 4,651,422 A | 3/1987 | Everts |
| 4,712,363 A | 12/1987 | Claborn |
| 4,756,084 A | 7/1988 | Morita |
| 4,823,464 A | 4/1989 | Gorski |
| 4,823,465 A | 4/1989 | Collins |
| 4,890,389 A | 1/1990 | Whitkop |
| 5,010,720 A | 4/1991 | Corsi |
| 5,020,223 A | 6/1991 | Desent et al. |
| 5,048,187 A | 9/1991 | Ryan |
| 5,060,383 A | 10/1991 | Ratkiewich |
| 5,077,898 A | 1/1992 | Hartwig |
| D344,088 S | 2/1994 | Tuggle et al. |
| 5,351,403 A | 10/1994 | Becker et al. |
| 5,446,964 A | 9/1995 | Woods et al. |
| 5,493,784 A | 2/1996 | Aiyama |
| D369,071 S | 4/1996 | Tuggle et al. |
| D372,649 S | 8/1996 | Tuggle et al. |
| D373,712 S | 9/1996 | Bridgers |
| 5,584,348 A | 12/1996 | Butler |
| 5,594,990 A | 1/1997 | Brant et al. |
| 5,615,970 A | 4/1997 | Reekie et al. |
| 5,634,322 A | 6/1997 | Woods et al. |
| 5,644,844 A | 7/1997 | Pink |
| D382,779 S | 8/1997 | Meisner et al. |
| D382,780 S | 8/1997 | Meisner et al. |
| 5,950,317 A | 9/1999 | Yates et al. |
| 5,996,234 A | 12/1999 | Fowler et al. |
| 6,052,976 A | 4/2000 | Cellini et al. |
| 6,324,764 B1 | 12/2001 | Watkins |
| 6,324,765 B1 | 12/2001 | Watkins, Sr. |
| 6,327,781 B1 | 12/2001 | Sinclair et al. |
| 6,327,782 B1 | 12/2001 | Blevins |
| D463,230 S * | 9/2002 | Robson .......................... D8/8 |

* cited by examiner

PLANT PROTECTOR

TECHNICAL FIELD

The present invention relates to a string trimmer and in particular to a mechanism for shielding plants from the cutting path swept out by the rotating cutting line of the string trimmer.

BACKGROUND OF THE INVENTION

String trimmers are portable hand-held outdoor gardening power tools, used for domestic and commercial grass cutting and are powered by electrical motors or small combustion engines. A string trimmer has a cutting head from which extends a cutting line, the cutting line commonly being a flexible plastic wire. The cutting line extends radially from the axis of rotation of the cutting head when it is rotatably driven by a motor. In the usual cutting mode, the cutting head and cutting line rotate a high rotational speed about an approximately vertical axis. The rotating cutting line is placed in close proximity to the grass to be cut. The grass caught within the path swept out by the rotating cutting line is severed when impacted by the cutting line.

This method of cutting grass is quick and highly effective and can be employed in dense grass or on a household lawn.

Indiscriminate cutting of soft vegetation may not be a problem when cutting in certain locations. However, the string trimmer may be used in a location where there is a mixture of soft vegetation where some parts need to be cut and other parts need to be left. One example is where the verge of a lawn abuts a flower bed containing small and delicate flowers which overhang the grass. In this example a string trimmer cannot be used easily to cut the grass without damaging overhanging flowers that are also caught in the path swept out by the rotating cutting line.

The example cited above illustrates a situation when the user wishes to protect certain plants from the rotating cutting line. There are, however, instances when the user wishes to protect the rotating cutting line from coming into contact with hard objects that the cutting line was not intended to cut, such as rocks or stones. When the rotating cutting line makes contact with such objects, it is liable to be damaged and therefore would need to be replaced. This situation is also undesirable and a device which protects certain plants from the rotating cutting line should also be capable of protecting the rotating cutting line from damaging itself against hard objects.

Prior art document EP 0 893 050 discloses a length of rigid metal wire attached to and extending outwardly from the motor housing of a string trimmer and is adapted to form a guard surrounding part of the path swept out by the rotating cutting line. EP 0 893 050 further discloses that the wire can also act as an edging guide. When acting as an edging guide, the rotating cutting line can cut a uniform edge along a lawn edge or a curb without coming into contact with the lawn edge or curb.

However, there are two problems associated with the guard disclosed in EP 0 893 050. The metal wire, when acting as a guard, does not surround the path swept out by the rotating cutting line. This leaves ample space for vegetation, such as overhanging plants or flowers, to enter into the path swept out by the rotating cutting line which results in damage to this vegetation.

Secondly, when the string trimmer is used in edging mode, the metal wire acts as a guide and therefore is unable to act as a guard. As such no protection is provided against cutting vegetation which is not intended to be cut.

SUMMARY OF THE INVENTION

Accordingly, there is provided a string trimmer comprising:
an elongate shaft; and
a cutting head rotatably mounted on one end of the shaft;
a cutting member which extends from the cutting head;
an attachment mounted on the string trimmer; the attachment being pivotally mounted on the string trimmer by at least one pivot mechanism wherein the pivot mechanism comprises a latching mechanism about which the attachment is capable of latchably rotating relative to the string trimmer.

Preferably the attachment is a barrier which is capable of being used by an operator to move vegetation away from a path swept out by the cutting member.

The string trimmer according to the present invention has the advantage that the lightweight barrier which acts as a plant protector can be rotatably moved between a plurality of latchable positions without the need of dismantling any part of the string trimmer. When in use, a primary function of the barrier is to provide a barrier between overhanging plants and the path swept out by the rotating cutting line, while still allowing low level vegetation like for example grass, to pass below the lower edge of the plant protector and into the path of the rotating cutting line. The plant protector has two 'in-use' positions; one position for flat cutting and, the other for vertical edge trimming, such that when located in both 'in-use' positions the lower edge of the plant protector is approximately horizontal when the string trimmer is used in the appropriate way. The plant protector can be pivoted between these two positions and latch in them using the latch mechanism according to present invention.

The user may wish to maximize the cutting potential of the string trimmer by locating the plant protector the 'out-of-use' position thereby cutting all plants falling within the field of action not embraced by the protection cover regardless of their height. Again this can be achieved by pivoting the barrier to and latchably holding it in the "out of use" position.

The latching mechanism may comprise a first member having a wall, the wall comprising at least one flat and at least one trough; a second member held in rotational contact with the first member having at least on resilient tongue; the resilient tongue having a protrusion which is engaged with and capable of sliding along the wall as the first member rotates in relation to the second member so that it is either in contact with the trough or the flat, the tongue resiliently deforming as it slides along the wall depending on its position in relation to the wall; wherein as the barrier rotates relative to the string trimmer, the first member rotates in relation to the second member causing the protrusion to slide onto the wall, the latching mechanism latching the attachment in the predetermined position when the protrusion engages with the trough.

The flat may be straight or may be curved along its length. Alternatively, the flat may undulate along its length.

The wall may be formed around the hexagonal collar, the sides of the hexagonal collar forming the flats, the troughs being formed between adjacent flats.

When the wall is formed around a hexagonal collar, the flats are straight along their length. Such a collar is described in the first embodiment of the present invention.

Alternatively, the wall may be formed around a circular collar, troughs being spaced around the periphery of the circular collar, the parts of the periphery of the circular collar between the troughs forming the flats.

When the wall is formed around a circular collar, the flats are curved along their length. Such a collar is described in the second embodiment of the present invention.

BRIEF DESCRIPTION OF THE DRAWINGS

Three embodiments of the present invention will now be described with reference to the following drawings, of which.

DETAILED DESCRIPTION OF THE PREFERRED EMBODIMENTS

Figure 1:
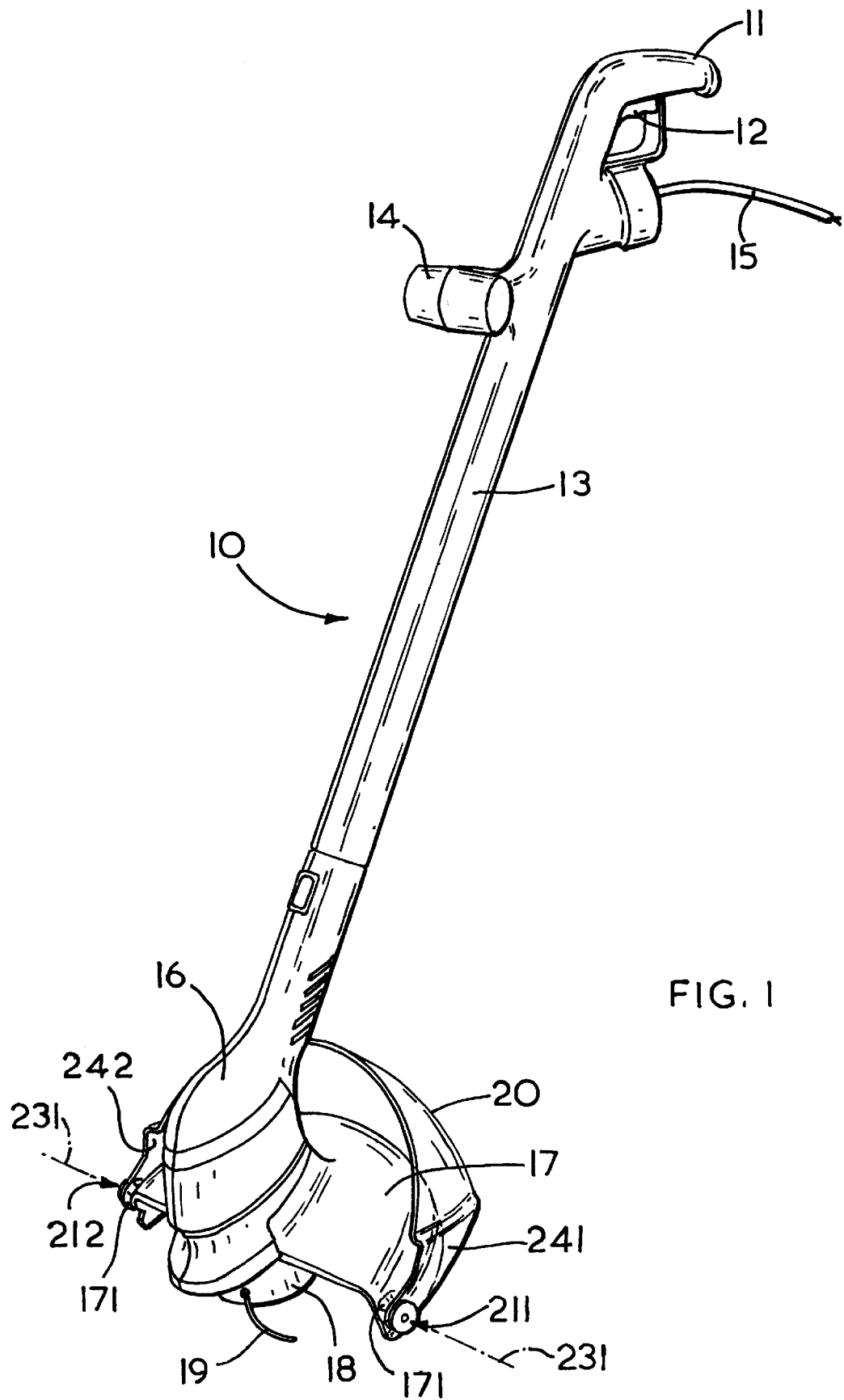
FIG. 1 shows a perspective view of a string trimmer with the plant protector in a storage position in accordance with the first embodiment.

Referring to FIG. 1, a string trimmer (10) comprises an elongate shaft (13), a rear handle (11) attached to one end of the elongate shaft (13), an electrical trigger switch located (12) below the rear handle (11), a front support handle (14) attached part way along the elongate shaft (13), an electrical cable capable (15) of carrying electrical current and entering the elongate shaft (13) at a location below the rear handle (11), a motor housing (16) attached to the other end of the elongate shaft (13) in which is mounted an electric motor (not shown), a semi-circular protection guard (17) attached to the motor housing (16) having a semi-circular edge (176), a cutting head (18) rotatingly driven by the electric motor, a cutting line (19) which extends from the cutting head (18), and a plant protector (20) pivotally attached to the protection guard (17) at two pivot points (211; 212) in symmetrical fashion.

When operating the string trimmer (10) the user typically stands in an upright position, holding the weight of the string trimmer (10) by the rear handle (11) and directing the cutting head with the front support handle (14), the elongate shaft (13) extending downwardly from the rear handle (11) towards the motor housing (16) and the ground. The cutting head (18) is located in close proximity to, but clear of, the ground and is rotatingly driven by the electric motor when the electric motor is energized by the user. Electrical current supplied by the electrical cable (15) is supplied to the electric motor via the electrical switch (12), the electrical switch (12) connecting or disconnecting the electrical supply to the electric motor when operated by the user. When connected to the electrical current supply the electric motor is energized and rotatingly drives the cutting head (18) and the cutting line (19). Conversely, disconnection of the electrical current supply de-energizes the electric motor which results in the rotation of the cutting head (18) and cutting line (19) ceasing. The cutting line (19) is a strong elongate filament, like for example, plastic wire, which extends radially from the cutting head (18). When the cutting head (18) is rotatingly driven by the electric motor, the cutting line (19) turns with the cutting head (18) about the same axis and sweep at a circular path cutting any soft vegetation, for example grass, which enters the path swept out by the rotating cutting line (19).

The protection guard (17) is part circular in shape and is adapted to surround part of the path swept out by the line on the side of the string trimmer (10) where the user normally stands during operation. By surrounding the cutting path the protection guard (17) prevents the user from accidentally placing their foot within the path of the rotating cutting line (19). The part of the path swept out by the cutting line on the other side of the motor housing (16) is exposed so that any grass or soft vegetation falling within the path will be cut.

Figure 2:
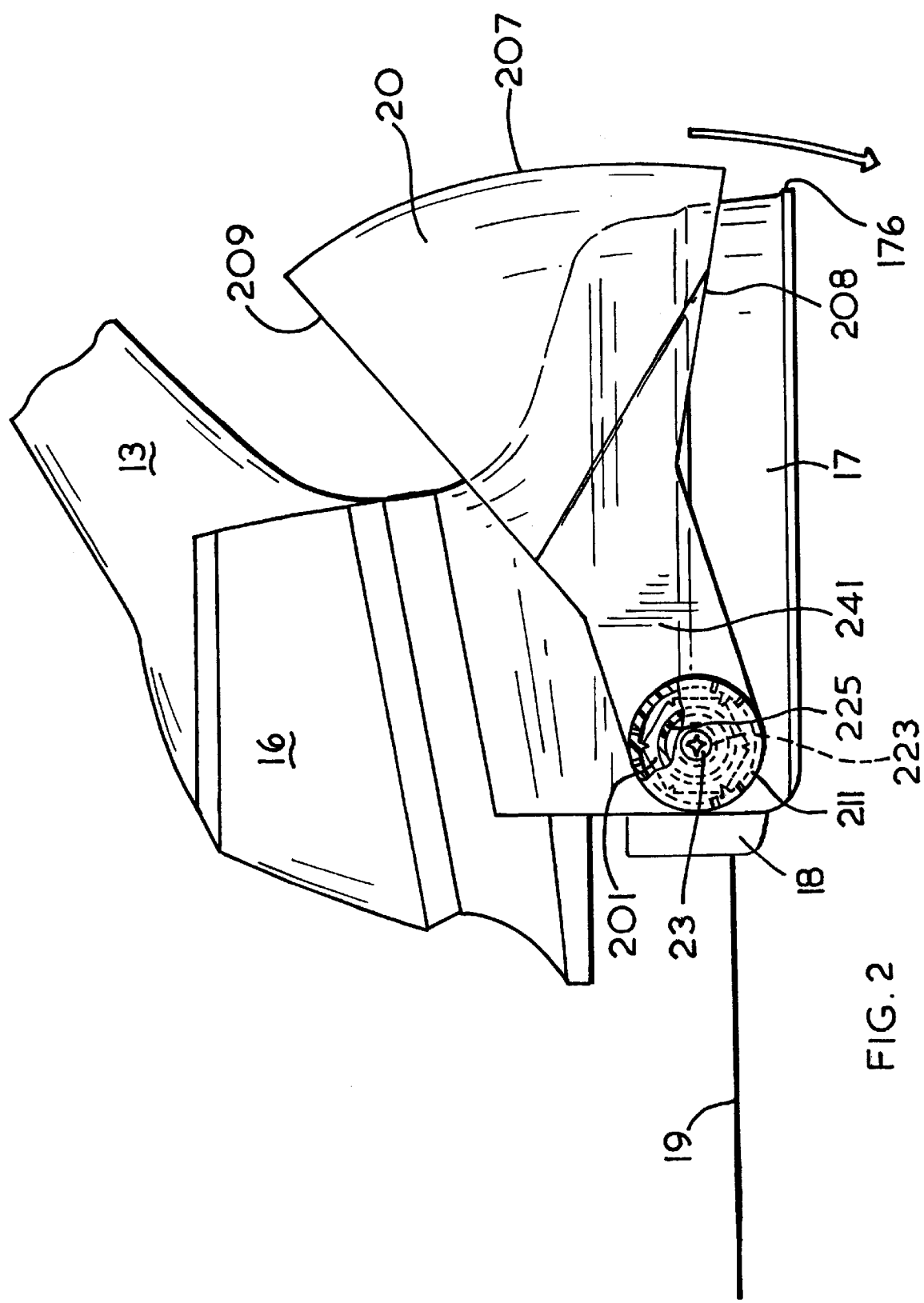
FIG. 2 shows a side view of the motor housing and guard of the string trimmer in cutting mode with the plant protector in a storage position.
Figure 4:
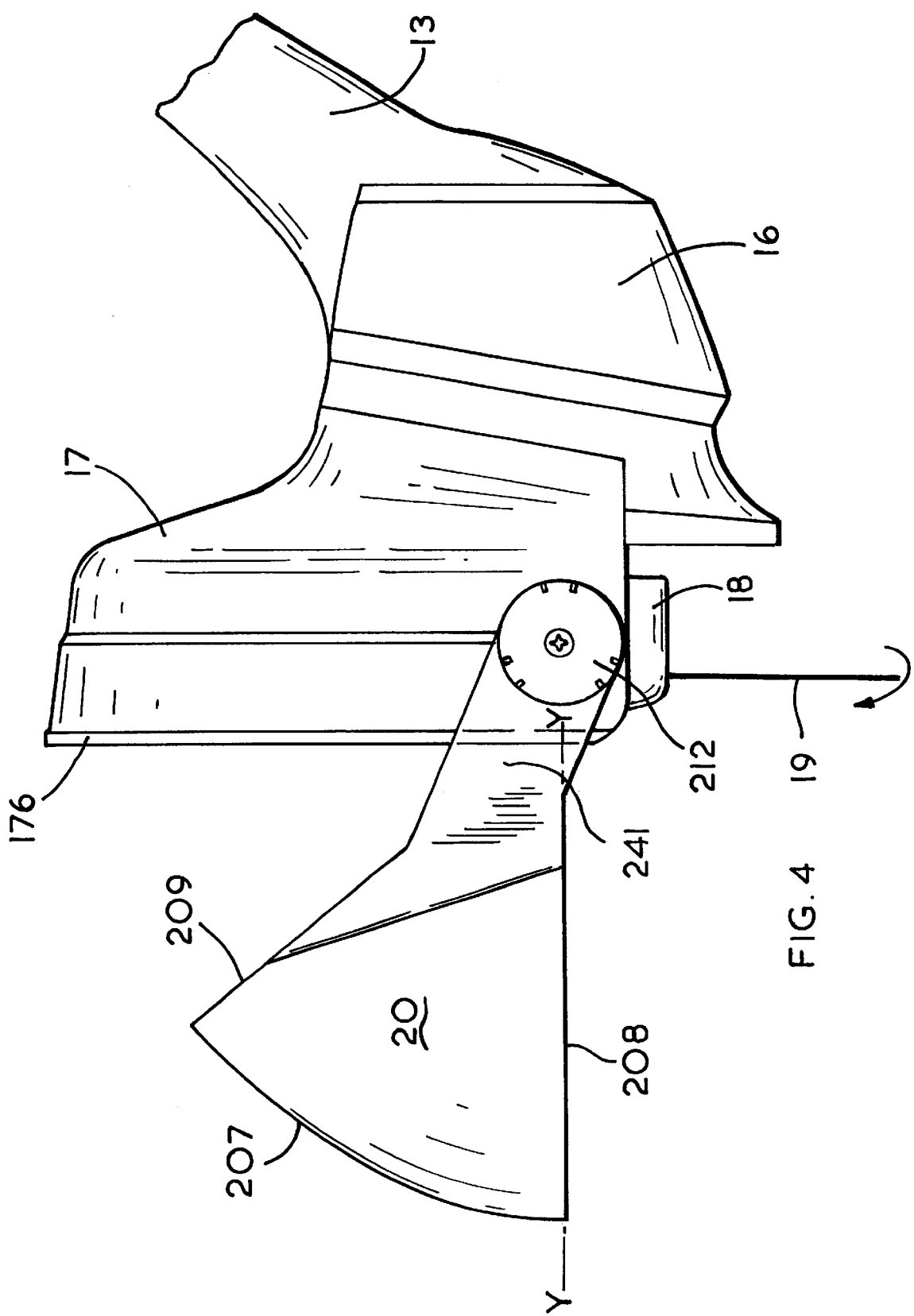
FIG. 4 shows a side view of the motor housing and guard of the string trimmer in edging mode with the plant protector in the "vertical edge cutting" position.

The plant protector (20) is mounted so that it pivots about an axis which perpendicular to the axis of rotation of the cutting head (18) when it is in its flat cutting position as shown in FIG. 2 and also when it is in its vertical edge cutting position as shown in FIG. 4.

The plant protector (20) is able to be pivoted from a first position (not shown) where it is adjacent the elongate shaft (13) located just forwards of the elongate shaft (13) through an angle of over 270° first to a position forward of the string trimmer (see FIG. 3) to a position below the string trimmer (not shown), to a position rearward of the string trimmer (see FIG. 2) and to a second position (not shown) adjacent the elongate shaft (13), however, now being located just to the rear of the elongate shaft (13).

Referring to FIG. 2, the plant protector (20) is made of transparent plastics material and comprises, a body. (207), a first elongate side member (241), and a second symmetrical elongate side member (242). The first side member (241) is located on one side of the body (207) and extends from the body (207) to the first pivot point (211). The second side member (242) is located on the other side of the body (207) and extends from the body (207) to the second pivot point (212) in symmetrical fashion to the first side member (241).

Figure 6:
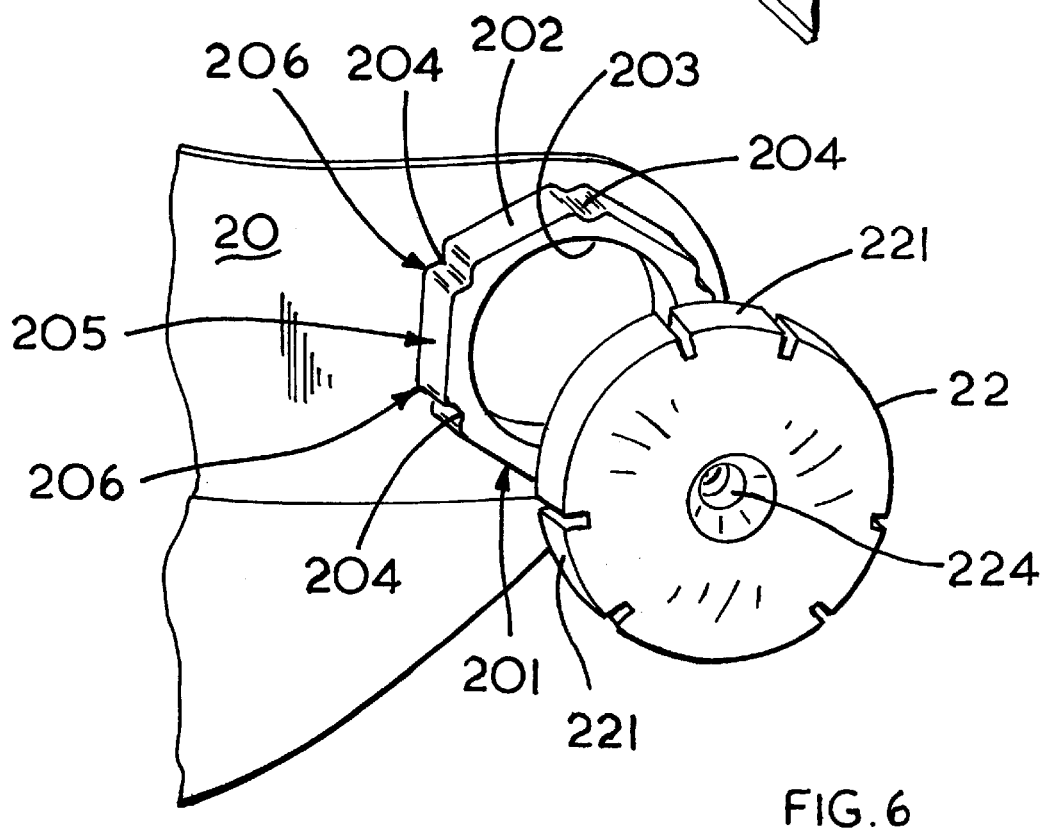
FIG. 6 shows an exploded view of the cap and part of the plant protector from the other side to that shown in FIG. 5.
Figure 7:
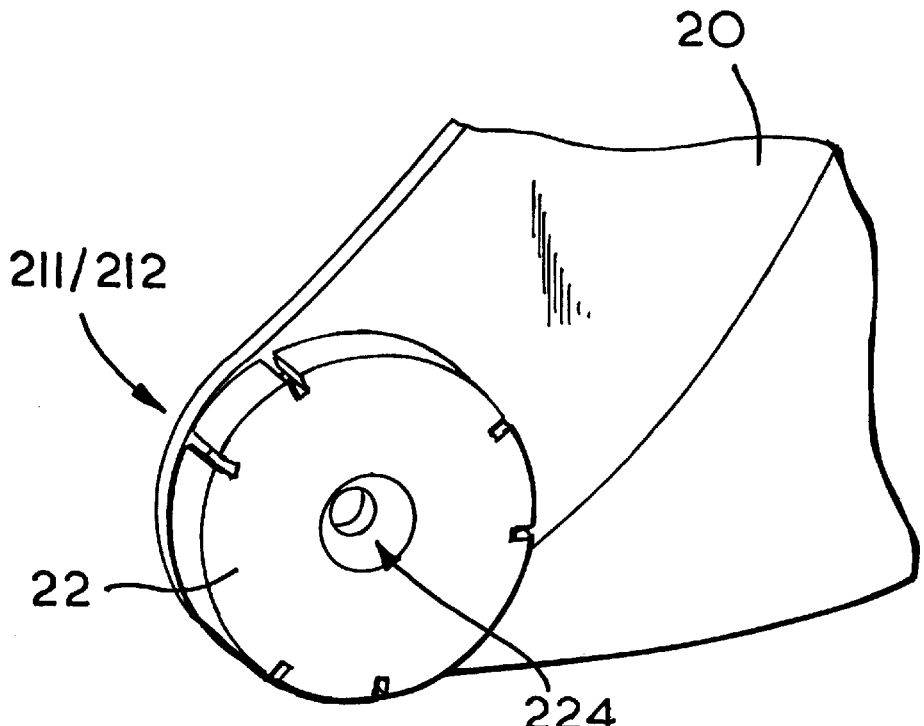
FIG. 7 shows a view of the cap and part of the plant protector when assembled from the same side as that shown in FIG. 6.
Figure 8:
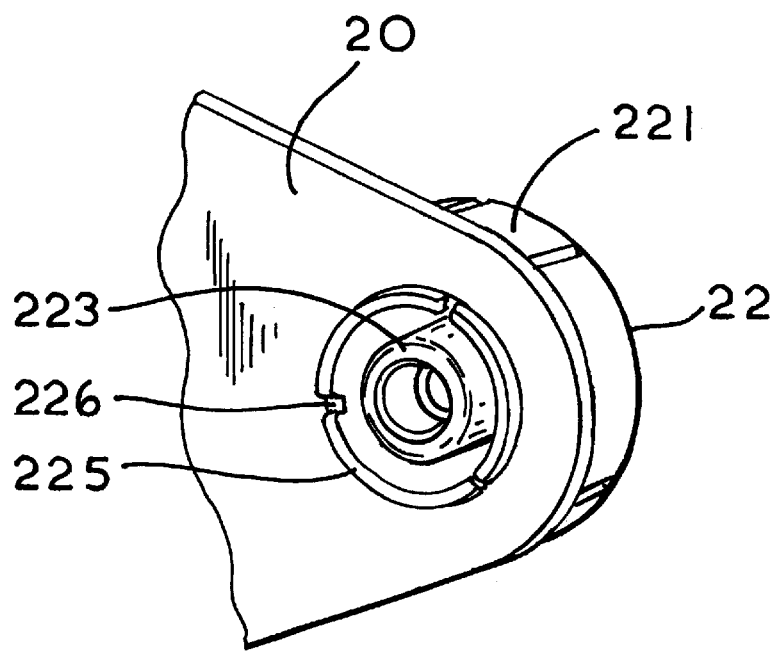
FIG. 8 shows a view of the cap and part of the plant protector when assembled from the other side as that shown in FIG. 7.
Figure 9:
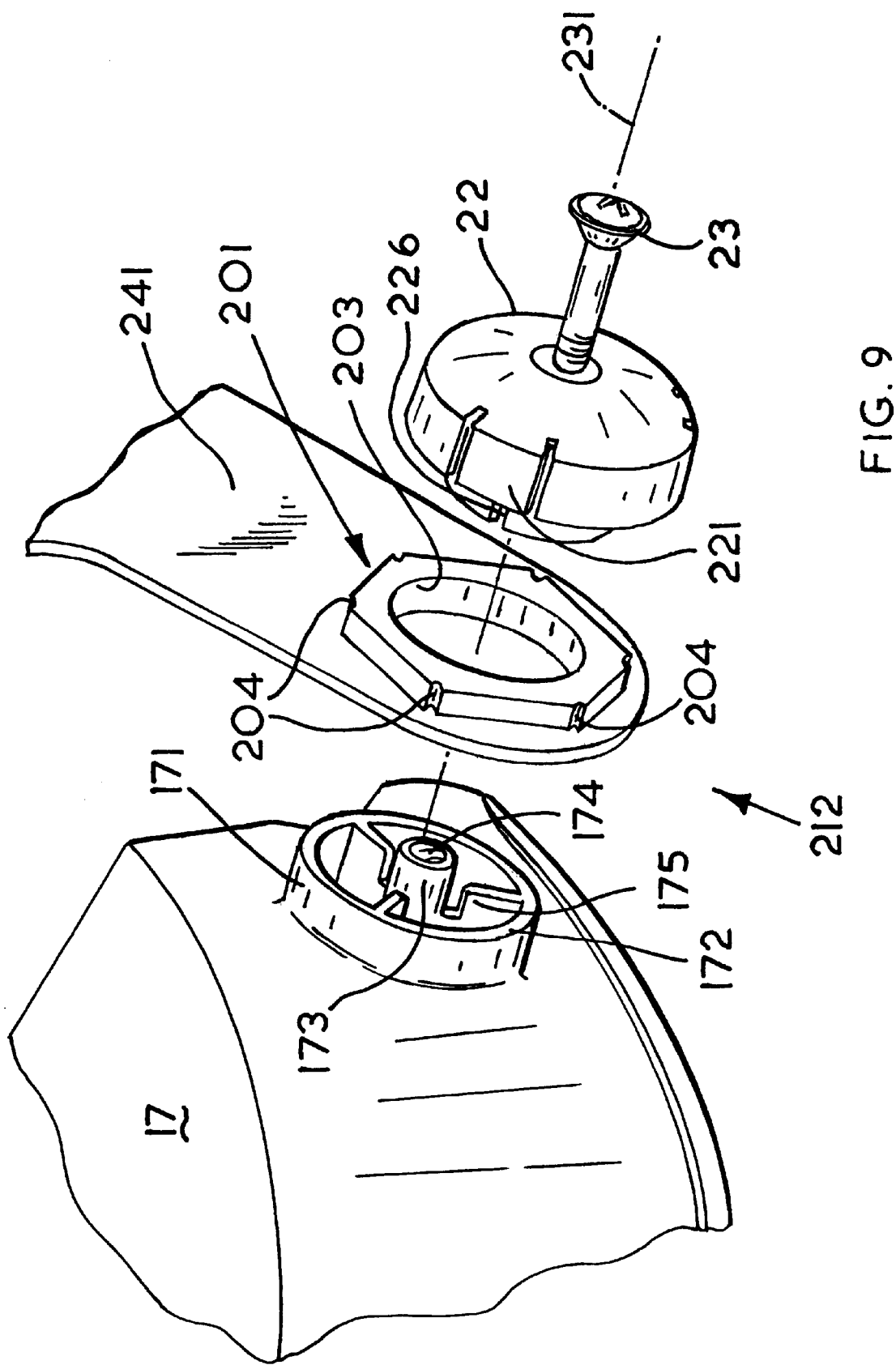
FIG. 9 shows an exploded view of cap and guard.

The first (241) and second (242) side members each have a hexagonal collar (201) located at the end of the side member away from the body (207) as shown in FIG. 6. The hexagonal collar (201) of the first (241) and second (242) side members form part of the first (211) and second (212) pivot points respectively. The body (207) is similar in shape to a motor cycle crash helmet visor. The body (207) has a first edge (208), and a second edge (209), each edge describing an arc. The radius of the spherical section of the body (207) is sufficiently greater than the outer radius of the protection guard (17) so that the plant protector (20) can rotate about the pivot points (211;212) through its full range of pivotal movement without making contact with the protection guard (17) as best shown in FIG. 2. The first (211) and second (212) pivot points act together as both pivotal support and latch mechanism for the plant protector (20). The pivot points (211;212) are capable of releasably latching the plant protector (20) in up to six different pre-determined pivotal stationary positions, or allowing rotational movement of the plant protector (20) in relation to the guard (17) when urged by the user. In particular, the pivot points (211;212) are formed so that three of the six stationary positions can hold the plant protector in either a 'storage' (FIG. 2), a 'trimming' (FIG. 3) or an 'edge cutting' (FIG. 4) position.

Figure 3:
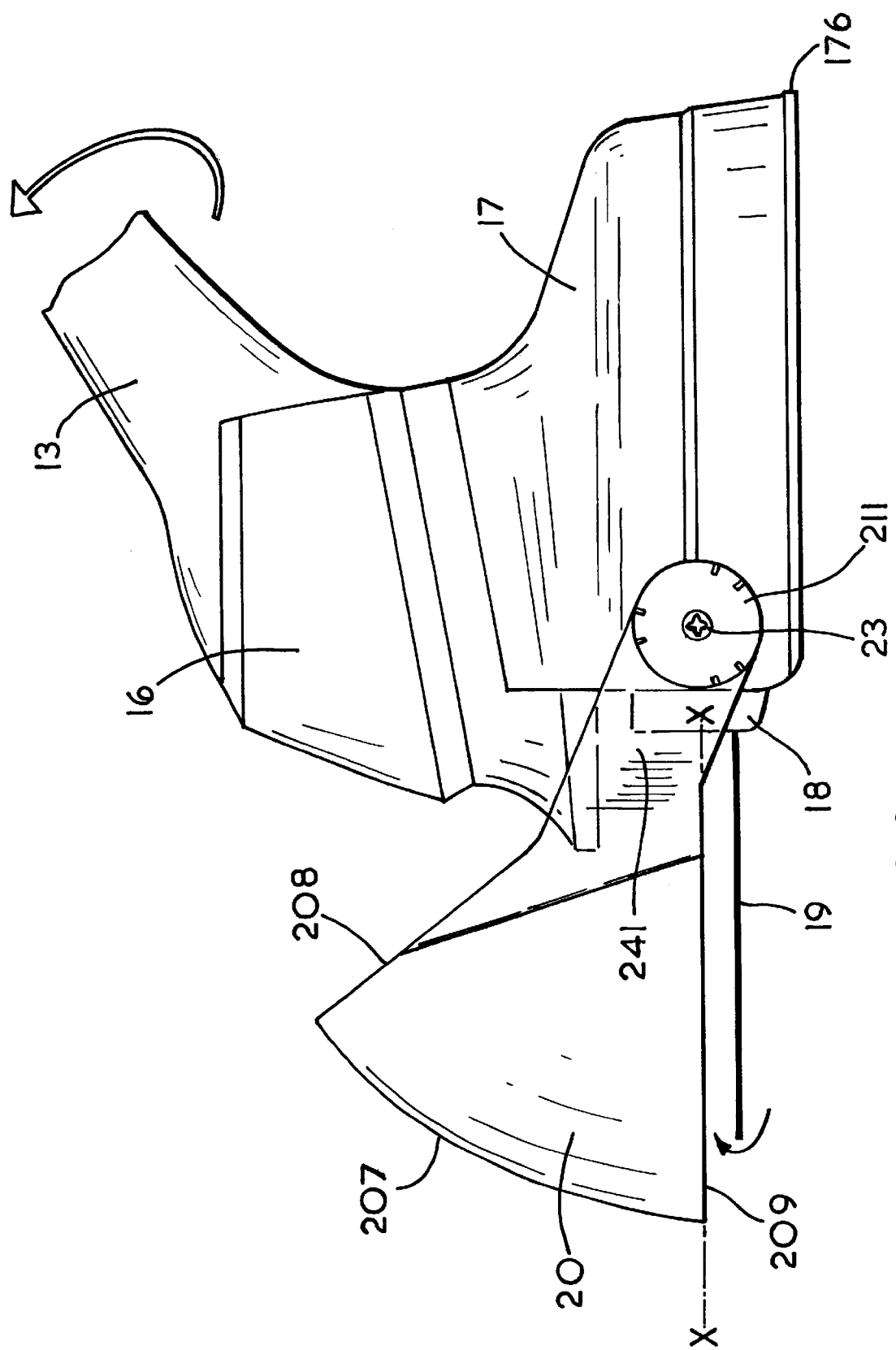
FIG. 3 shows a side view of the motor housing and guard of the string trimmer in cutting mode with the plant protector in the "flat cutting" position.

There now follows a description, with reference to FIGS. 2 to 4, of the plant protector (20) located in these three stationary positions.

FIG. 2 shows the plant protector (20) in the "storage" position. The body (207) of the plant protector (20) is located behind the guard (17). In the storage position the plant protector (20) surrounds part of the rear outer surface of the protection guard (17), the protection guard (17) surrounding approximately half the circular path swept out by the rotating cutting line (19). The plant protector (20) is not in use when located in the storage position.

FIG. 3 shows the plant protector (20) in the "trimming" position. The body (207) of the plant protector (20) is located at the front of the motor housing (16) and projects forward. The second edge (209), as viewed from the side in FIG. 3, is located in a plane X—X, the plane X—X being substantially parallel to the ground and being the closest part of the plant protector (20) to the rotating cutting line (19). The path swept out by the rotating cutting line (19) is also parallel to the ground and is located just beneath the plant protector (20). The rotating cutting line (19) is located closer to the ground than the edge (209) in order to cut low-level vegetation like, for example, grass while other overhanging plants are pushed away by the body (207) of the plant protector (20) and therefore protected from the rotating cutting line (19).

FIG. 4 shows the plant protector (20) in the "edge cutting" position. The cutting head (18) of the string trimmer (10) is orientated so that the path swept out by the rotating cutting line (19) is vertical. When the path swept out by the rotating cutting line (19) is vertical, the string trimmer can be used to cut grass overhanging the vertical edge of a grass lawn adjoining a flower bed. The motor housing (16) is located on the grass lawn side of the path swept out by the rotating cutting line (19), and the plant protector (20) is located on the opposite side of the path swept above the flower bed. The first edge (208), as viewed from the side in FIG. 4, is located within a plane Y—Y, the plane Y—Y being parallel to the ground and being perpendicular to the path swept out by the rotating cutting line (19). In the "edge cutting" position the plant protector (17) acts as a shield surrounding part of the upper half of the path swept out by the rotating cutting line (19) thereby protecting those plants and flowers rooted in the flower bed and overhanging the vertical edge of the lawn from the rotating cutting line (19).

The first (211) and second (212) pivot points are located on opposite sides of the guard (17) and are constructed in the same manner. A description of the construction of the plant protector of the first pivot point (211) is equally applicable to the construction of the second pivot point (212). The construction of the first pivot point (211) will now be described with reference to FIGS. 5 to 9.

The pivot point (211) comprises:
a) a raised section (171) moulded into the protection guard (17), the raised section (171) comprising an outer circular ridge (172), a central hub (173) having a threaded aperture (174), and three shoulders (175) extending radially in from the circular ridge (172) to the central hub (173) (see FIG. 9);
b) a hexagonal collar (201) moulded into the plant protector (20) having a circular internal aperture (203), the hexagonal collar (201) having six outer flats (202) inter-posed by six 'v'-shaped troughs (204), the flats (202) each comprising a mid-point (205) and two extreme-ends (206), an extreme-end (206) being formed at the transitional point between a flat (202) and its adjacent trough (204) (see FIG. 6);
c) a circular cap (22) made of resilient material, comprising a perimeter wall (227) and three tongues (221), wherein the three tongues (221) form part of the perimeter wall (227), each of which is capable of resilient deformation and each one has a protrusion (222). The circular cap (22) further comprises a central collar (223) forming an aperture (224) and an annular raised portion (225) located in the annular space between the collar (223) and the perimeter wall (227). The annular raised portion (225) has three grooves (226) on its outer surface. Each of the three grooves (226) is adapted to simultaneously receive one of the three shoulders (175) when the pivot point (211) is assembled (see FIG. 5);
d) a threaded bolt (23) forming the axis of rotation (231) of the pivot point (211).

Figure 5:
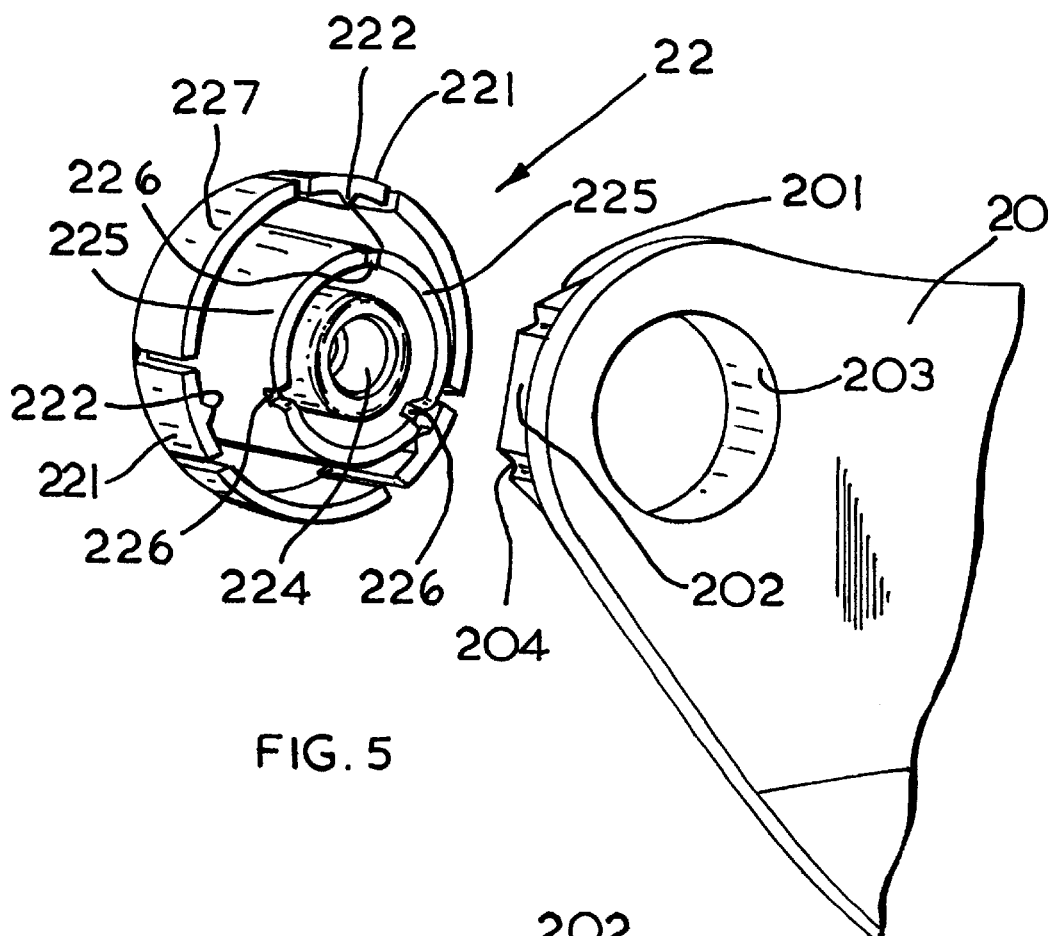
FIG. 5 shows an exploded view of the cap and part of the plant protector from one side.

Assembly of the pivot point (211) is a three stage process:

Firstly unite the cap (22) and the plant protector (20) so that the raised portion (225) of the cap (22) is received by the aperture (203) on the plant protector (20) (as shown by FIG. 5) and the hexagonal collar (201) is received by the annular trough located between the annular raised portion (225) and the perimeter wall (227) of the cap (22) (as shown in FIGS. 5 and 6), such that each protrusion (222) makes contact with the mid-point (205) of one of the flats (202) without resilient deformation of the tongue (221).

Secondly, unite both the cap (22) and the plant protector (20) with the guard (17) so that the hub (173) of the guard (17) is received by the aperture (224) of the cap and the raised portion (225) engages with the three shoulders (175), such that each shoulder (175) is received by one of the three grooves (226) in the raised portion (225) thereby preventing rotational movement of the cap (22) relative to the plant protector (20).

Thirdly, securely fix the cap (22) to the guard (17) with the bolt (23) which engages with threaded aperture (174) of the guard (17).

The pivot points (211;212), once assembled, allow rotational movement of the plant protector (20) relative to the guard (17) and the cap (22), subject to interaction between the protrusions (222) on the tongues (221) and the troughs (204). The six flats (202) and six troughs (204) of the hexagonal collar (201) form part of, and move with, the plant protector (20). Each flat (202) is arranged so that the distance between its mid-point (205) and the axis of rotation (231) is smaller than the distance between one of its extreme ends (206) and the axis of rotation (231). When a protrusion (222) makes contact at the mid-point (205) of an adjacent flat (202) the tongue (221) on which is mounted that protrusion is not deformed. However, should a protrusion (222) slide towards an extreme end (206) of that same flat (202), due to rotation of the plant protector (20) relative to the guard (17) and the cap (22), then the protrusion (222) is pushed radially outwards and away from the axis of rotation (231) due to contact with the flat (202) and, resiliently deforms its tongue (221). The resilient nature of the tongue (221) resists the sliding of the protrusion (222) from the mid-point (205) to the extreme-end (206).

Moving the protrusion (222) further from the mid-point (205) and beyond the extreme-end (206) engages the protrusion (222) with a 'v'-shaped trough (204). The distance between the bottom of the trough (204) and the axis of rotation (231) is smaller than the distance between the extreme-end (206) and the axis of rotation (231), therefore the deformation of the tongue (221) is reduced once the protrusion (222) passes the extreme-end (206) and engages with the trough (204). Once the protrusion (222) is engaged with the trough (204) the resilient nature of its tongue (221) resists movement of the protrusion (222) from the trough (204).

The protrusions (222), the flats (202) and the troughs (204) are all mutually aligned so that if one protrusion (222) is engaged with a trough (204) then each of the other two protrusions (222) are simultaneously engaged with the other troughs (204). Equally, if one protrusion (222) is located at the mid-point (205) of a flat (202) then each of the other protrusions (222) is simultaneously located at the mid-point (205) of a flat (202), and so on. The first (211) and second (212) pivot points resist relative rotational movement between the guard (17) and the plant protector (20) because this involves the protrusions (222) moving from one trough (204) to engage with another trough (204).

This acts as a latch mechanism, only allowing rotational movement of the protrusions (222) between two troughs (204) when a sufficient rotational force exerted by the user is great enough to overcome the resilient force of the tongues (221). Conversely, the effect of gravity upon the mass of the plant protector (20) does not exert a great enough rotational force about the axis of rotation (231) to overcome the resilient force of the tongues (221) and cause rotational movement of the protrusions (222) between two troughs (204). Therefore the first (211) and second (212) pivot points hold the plant protector (20) stationary in relation to the protection guard (17) in any one of six positions provided each protrusion (222) is engaged with a trough (204). These six positions are pre-determined by the orientation of six troughs (204) relative to the plant protector (20).

During its life, a string trimmer risks being stored for a long time with the plant protector (20) positioned relative to the protection guard (17) in such a way that the protrusions (222) are not engaged with a trough (204). In such a case, each protrusion (222) must instead be located somewhere upon the surface of an adjacent flat (202). This location may be the extreme end (206) of the flat (202) causing continual deformation of the tongue (221). Over time, continual deformation of the resilient material forming the tongues (221) may result in plastic deformation of the tongues (221). Once plastically deformed, the tongues (221) loose their resilience and are unable to fully engage their protrusions (222) with the troughs (204). Once this has happened, the holding force of first (211) and second (212) pivot points is reduced. In cases of extreme deformation the effect of gravity upon the mass of the plant protector (20) can be sufficient to exert a great enough rotational force about the axis of rotation (231) to overcome the what remains of resilient force of the tongues (221).

In this embodiment such a risk is reduced due to the inclusion of straight flats (202) between the troughs (204). If each protrusion (222) is located at one extreme end (206) of the flat (202) then the protrusion (222) and hence the tongue tends to slide along the surface from the extreme end (206) to the mid-point (202) reducing distance between the axis of rotation (231) and protrusion. The tongue (221) is resiliently deformed when its protrusion (222) is located at one extreme end (206). However, the same tongue (221) is not deformed when its protrusion (222) is located either at the mid-point (202) or is engaged with one of the troughs (204). If a string trimmer is stored with each protrusion (222) located at one extreme end (206) then, the resilient nature of the tongue (221) urges its protrusion (222) to slide towards the midpoint (205) of the same flat (202) where the tongue (221) is no longer deformed. The use of flats (202) between troughs (204) provides a means of reducing the likelihood that the tongues (221) do not become plastically deformed. Therefore, the performance of the latching mechanism is less likely to deteriorate over time.

Though FIG. 3 shows the plant protector (20) located above the cutting line (19), the plant protector can be pivoted downwardly so that it surrounds the front half of the path swept out by the cutting line. When in this position, the protrusions (222) are engaged with the flats (202).

The second embodiment of the present invention will now be described with reference to FIGS. 10 and 11.

The same reference numbers have been used to describe the second embodiment as the first embodiment except where the design has been changed.

Figure 11:
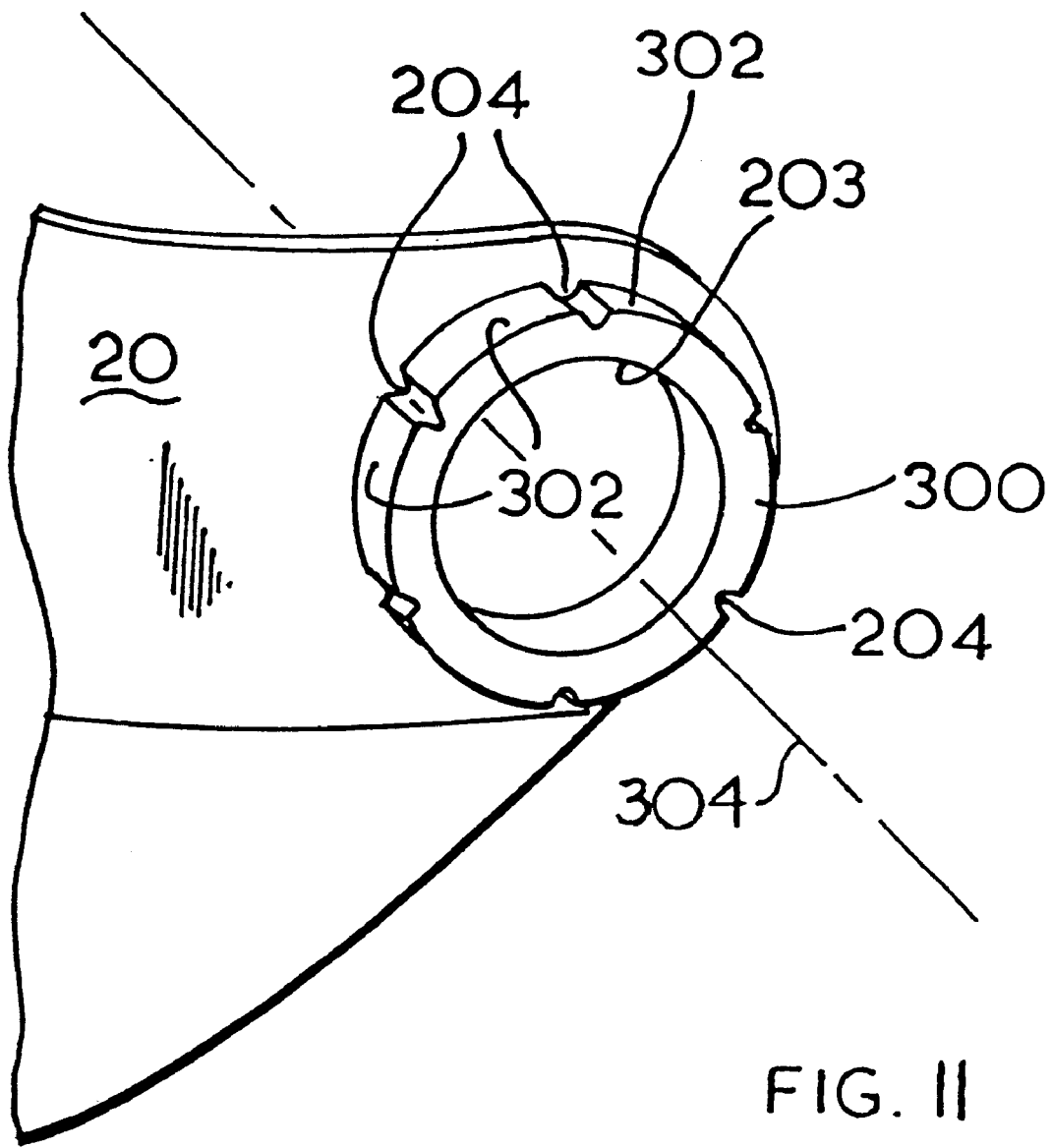
FIG. 11 shows a view of part of the plant protector showing the circular collar.

The design of the second embodiment of the present invention is the same as that of the first embodiment except that the hexagonal collar (201) on the plant protector of the first embodiment of the invention has been replaced by a circular collar (300) as shown in FIG. 11. The circular collar (300) comprises six flats (302) which are curved, each flat (302) having a radius of curvature about the axis (304) which passes through the centre of the collar (300) and which is the same as the other flats (302). Between each pair of flats (302) is located a trough (204), there being six troughs in total.

The second embodiment of the present invention works in the same manner as the first embodiment. When the protrusion (222) on the tongue (221) of the cap (22) is rotated from a position where it is engaged with a trough (204) to a position where it engages with a flat (302), the tongue resiliently deforms outwardly. However as the protrusion continues to rotate relative to the circular collar (300) it slides along the surface of the flat (302) of the circular collar (300), the amount of deformation of the tongue (221) remaining constant as it slides along the flat (302) until it reaches the next trough where it engages with trough to latch the pivot mechanism and hence the plant protector into a latched position.

Figure 10:
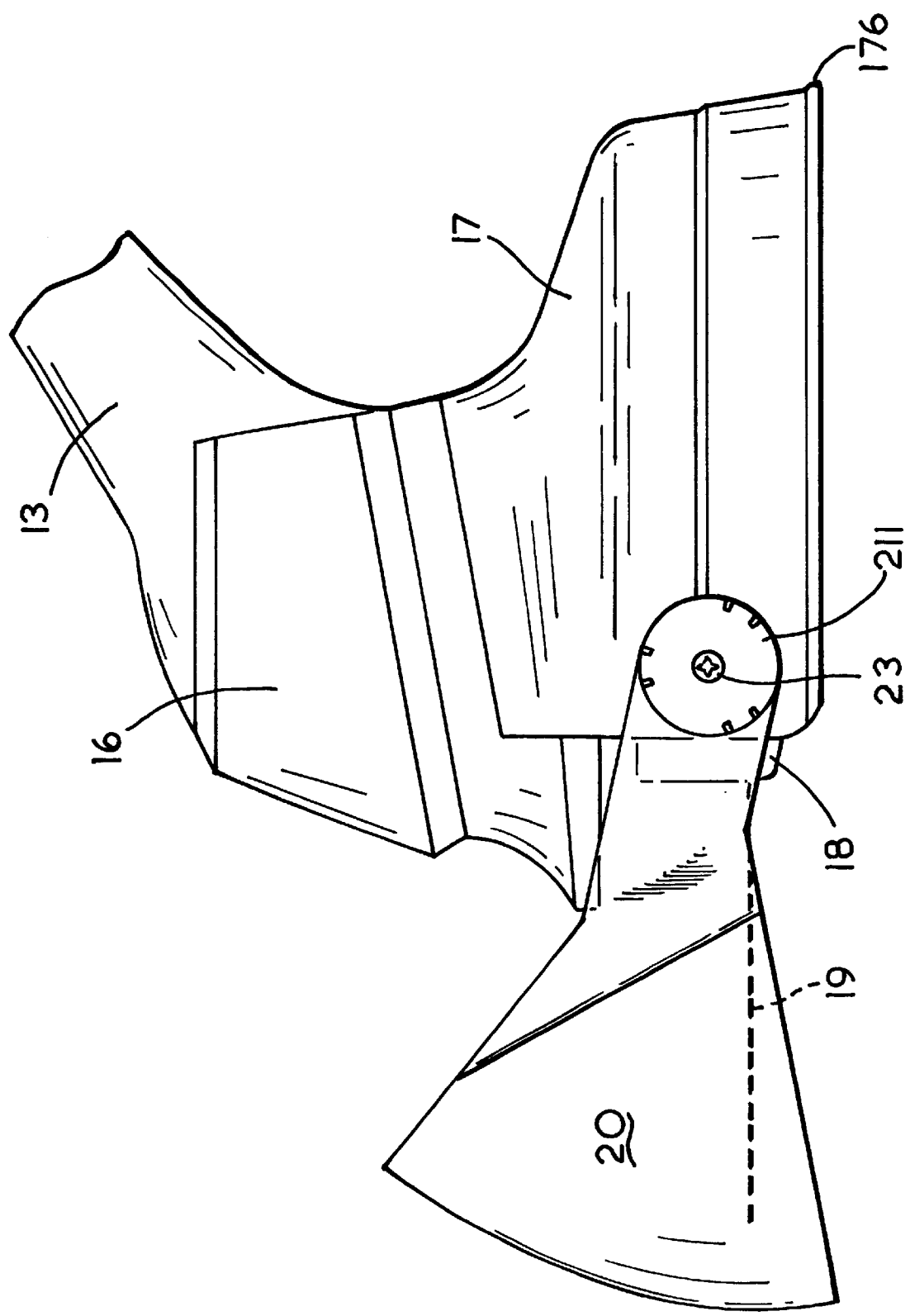
FIG. 10 shows a side view of the motor housing and guard of the string trimmer in a cutting mode with the plant protector in a position where it surrounds the edge of the path swept out by cutting line in accordance with the second embodiment of the invention.

The orientation of the troughs (204) about the axis (304) has been varied in the second embodiment to that of the first so that when the plant protector is in a forward projecting position in front of the cutting head (18) and the protrusions (222) are engaged with the troughs (204), it surrounds the front edge of the path swept out by the cutting line (19) when it rotates as shown in FIG. 10.

The design of the third embodiment of the present invention will be described with reference to FIG. 12 and is the same as that of the first embodiment except for the fact that the plant protector is mounted at its pivot points on the inside of the wall of the protection guard (17). Except for the plant protector (400) the same reference numbers have been used in FIG. 12 as those used to describe the first embodiment. The guard (17) is part circular in shape and is adapted to surround part of the rear of the path swept out by the rotating cutting line. The pivot points (not shown) are constructed in the same manner as those described in the first embodiment, the raised section molded into the guard facing inwardly towards the cutting head (18), the hexagonal collar on the plant protector and the cap being located within the space surrounded by the guard.

The radius of the plant protector (400) is less than that of the wall of the guard (17) but greater than that of the path swept out by the rotating cutting line.

The plant protector latchably pivots in the same manner as that of the first embodiment.

Figure 12:
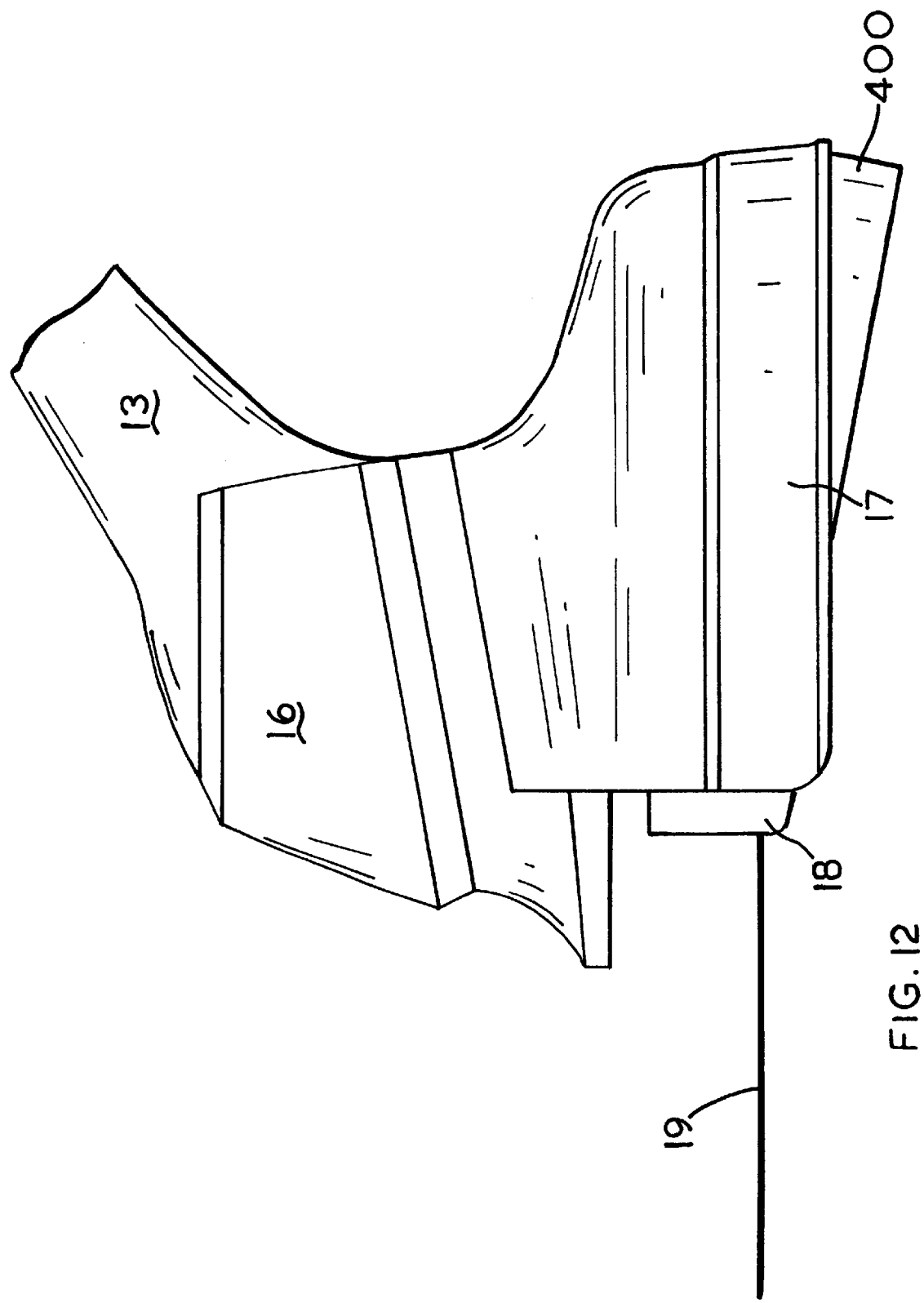
FIG. 12 shows a side view of the motor housing and guard of a string trimmer in cutting mode with the plant protector in the storage position according to the third embodiment of the present invention.

However, when the plant protector is pivoted to the "storage position" the top part of the plant protector locates to a position within the protection guard but surrounding the path swept out by the rotating cutting line as shown in FIG. 12.

It will be obvious to a person skilled in the art to reduce the width of the plant protector sufficient so that it is entirely located within the space surrounded by the guard when located in the "storage position".

What is claimed is:

1. A string trimmer, comprising:
   an elongate shaft;
   a cutting head rotatably mounted on one end of the shaft;
   a cutting member which extends from the cutting head;
   an attachment mounted on the string trimmer; and
   the attachment being pivotally mounted on the cutting head by at least one pivot mechanism wherein the pivot mechanism comprises a latching mechanism about which the attachment is capable of latchably rotating relative to the cutting head.

2. A string trimmer as claimed in claim 1, wherein the attachment comprises a barrier which is used by an operator to move vegetation away from a path swept out by the cutting member.

3. A string trimmer as claimed in claim 1, wherein the latching mechanism holds the attachment stationary relative to the string trimmer in at least one predetermined angular position.

4. A string trimmer as claimed in claim 1, wherein the latching mechanism comprises:
   a first member having a wall, the wall comprising at least one flat and at least one trough;
   a second member held in rotational contact with the first member having at least one resilient tongue;
   the resilient tongue having a protrusion which is engaged with and capable of sliding along the wall as the first member rotates in relation to the second member so that it is either in contact with the trough or the flat, the tongue resiliently deforming as it slides along the wall depending on its position in relation to the wall; and
   wherein as the attachment rotates relative to the string trimmer, the first member rotates in relation to the second member causing the protrusion to slide onto the wall, the latching mechanism latching the attachment in the predetermined position when the protrusion engages with the trough.

5. A string trimmer as claimed in claim 4, wherein the tongue is not resiliently deformed when the protrusion of the tongue is located within the trough.

6. A string trimmer as claimed in claim 4, wherein the tongue is resiliently deformed when the protrusion of the tongue is in contact with the flat.

7. A string trimmer as claimed in claim 6, wherein the resilient nature of the tongue urges a sliding movement of the protrusion of the tongue towards a position of contact with the mid-point of the flat, thereby urging pivotal movement of the attachment relative to the string trimmer.

8. A string trimmer as claimed in claim 4, wherein the flat has a mid-point and has extreme ends located at a transition point between the flat and an adjacent said trough wherein the tongue is not resiliently deformed when engaged with the mid-point but becomes resiliently deformed as it slides towards an extreme end.

9. A string trimmer as claimed in claim 4, wherein the wall is formed around a hexagonal collar having a plurality of sides, each sides of the hexagonal collar forming each flat, each trough being formed between adjacent flats.

10. A string trimmer as claimed in claim 9, wherein an axis of pivot of the attachment is the center of the collar.

11. A string trimmer as claimed in claim 4, wherein the wall is formed around a circular collar, each trough being formed around a periphery of the circular collar, each flats being formed by the periphery of the circular collar between adjacent troughs.

12. A string trimmer as claimed in claim 4, wherein the second member has three resilient tongues.

13. A string trimmer as claimed in claim 12, wherein each said protrusion of each of the tongues simultaneously engages the flat or the trough.

14. A string trimmer as claimed in claim 4, wherein the wall is formed on an end of an arm of the attachment.

15. A string trimmer as claimed in claim 4, wherein the second member is formed as part of a cap having a perimeter wall wherein the at least one tongue of the second member form part of the perimeter wall.

16. A string trimmer as claimed in claim 15, wherein the perimeter wall of the cap surrounds a collar when the second member is held in rotational contact with the first member.

17. A string trimmer as claimed in claim 15, wherein the latching mechanism comprises a third member mounted on the string trimmer and which engages with the cap to hold the cap stationary relative to the third member.

18. A string trimmer as claimed in claim 17, wherein the third member comprises three shoulders which engage with three grooves formed in an annular raised portion formed in the cap when the third member is engaged with the cap to hold the cap stationary relative to the third member.

19. A string trimmer as claimed in claim 18, wherein the shoulders engage the grooves through an aperture formed by an hexagonal collar.

20. A string trimmer as claimed in claim 18, wherein said cap comprises a central collar, the central collar having an aperture, the annular raised portion being concentrically located in an annular space formed by the central collar and the perimeter wall.

21. A string trimmer as claimed in claim 20, wherein the third member comprises a central hub having the three shoulders extending radially from the central hub, the three shoulders being spaced angularly equidistant from each other.

22. A string trimmer as claimed in claim 21, wherein the central hub comprises a threaded bore.

23. A string trimmer as claimed in claim 22, wherein the third member comprises an outer circular ridge, the three shoulders extending radially from the central hub to said ridge.

24. A string trimmer as claimed in claim 22, wherein the first, second and third members are held together by placing a bolt through the aperture of the central collar of the cap and which passes through the aperture of the hexagonal collar and engages the thread of the central hub of the third member.

25. A string trimmer as claimed in claim 24, wherein the string trimmer further comprises a guard, and wherein the third member is formed on the guard.

26. A string trimmer comprising:
   an elongate shaft; and
   a cutting head rotatably mounted on one end of the shaft;

a cutting member which extends from the cutting head; and an attachment mounted on the string trimmer characterized in that at least one mount is formed on the string trimmer, the mount comprising three shoulders which extend radially outwards from a central hub having a threaded bore to an outer circular ridge formed around the shoulders and the hub, wherein the attachment is mounted onto and interacts with the mount to support the attachment on the string trimmer.

27. A string trimmer as claimed in claim 26, wherein the attachment is pivotally mounted onto the mount.

28. A string trimmer as claimed in claim 27, wherein the attachment interacts with the mount in a manner so that it latchably pivots about the mount.

29. A string trimmer as claimed in claim 28, wherein the attachment comprises a barrier used by an operator to move vegetation away from a path swept out by the cutting member when it rotates.

30. A string trimmer as claimed in claim 26, wherein the string trimmer comprises a guard, the mount being formed on the guard.

31. An attachment for mounting on a string trimmer having at least one mount formed on the string trimmer, the mount comprising three shoulders which extend radially outwards from a central hub having a threaded bore to an outer circular ridge formed around the shoulders and the hub, characterized in that the attachment comprises means which are compatible to and capable of engaging with such a mount to secure the attachment to a string trimmer.

32. An attachment as claimed in claim 31, wherein the means engage with the shoulders to prevent relative rotation of at least part of the attachment in relation to the string trimmer.

33. An attachment as claimed in claim 32, wherein the means interact with the shoulders to allow latchable rotation of at least part of the attachment.

34. An attachment for a string trimmer comprising at least one hexagonal collar formed on the attachment and which forms an aperture, a plurality of sides of the collar being flat with troughs being formed between adjacent sides.

35. An attachment for a string trimmer comprising:
at least one circular collar formed on the attachment and which forms an aperture, wherein troughs are formed around the periphery of the collar and curved flats are formed between adjacent troughs; and a string trimmer cutting head adapted to rotatable receive the circular collar.

36. A cap for making an attachment onto a string trimmer comprising a perimeter wall having at least one resilient tongue formed as part of the perimeter wall;
the resilient tongue having a protrusion formed on it which faces inwardly, a central collar having an aperture formed through it; and
an annular raised portion formed in the cap having three grooves and which is located concentrically with the central collar in the annular space formed between the central collar and the perimeter wall.

37. A string trimmer comprising:
an elongated shaft; and
a cutting head rotatably mounted on-one end of the shaft;
a cutting member which extends from the cutting head, characterized in that there is provided at least one mount formed on the string trimmer comprising three shoulders which extend radially outwards from a central hub having a threaded bore to an outer circular ridge formed around outermost ends of the shoulders.

38. A string trimmer as claimed in claim 37, wherein the string trimmer comprises a guard, the mount being formed on the guard.

39. A string trimmer, comprising:
an elongate shaft;
a cutting head rotatably mounted on one end of the shaft;
a cutting member which extends from the cutting head;
an attachment mounted on the string trimmer; and
the attachment being pivotally mounted o n the string trimmer by at least one pivot Mechanism wherein the pivot mechanism comprises a latching mechanism about which the attachment is capable of latchably rotating relative to the string trimmer;
the latching mechanism including:
(i) a first member having a wall, the wall comprising at least one flat and at least one trough;
(ii) a second member held in rotational contact with the first member having at least one resilient tongue;
(iii) the resilient tongue having a protrusion which is engaged with and capable of sliding along the wall as the first member rotates in relation to the second member so that it is either in contact with the trough or the flat, the tongue resiliently deforming as it slides along the wall depending on its position in relation to the wall; and
wherein as the attachment rotates relative to the string trimmer, the first member rotates in relation to the second member causing the protrusion to slide onto the wall, the latching mechanism latching the attachment in the predetermined position when the protrusion engages with the trough.

40. The string trimmer of claim 39, wherein the tongue is not resiliently deformed when the protrusion of the tongue is located within the trough.

41. A string trimmer as claimed in claim 39, wherein the tongue is not resiliently deformed when the protrusion of the tongue is in contact with the flat.

42. A string trimmer as claimed in claim 41, wherein the resilient nature of the tongue urges a sliding movement of the protrusion of the tongue towards a position of contact with the mid-point of the flat, thereby urging pivotal movement of the attachment relative to the string trimmer.

43. A string trimmer as claimed in claim 39, wherein the flat has a midpoint and has extreme ends located at a transition point between the flat and an adjacent said trough wherein the tongue is not resiliently deformed when engaged with the mid-point but becomes resiliently deformed as it slides towards an extreme end.

44. A string trimmer as claimed in claim 39, wherein the second member has three resilient tongues.

45. A string trimmer, comprising:
an elongate shaft;
a cutting head rotatably mounted on one end of the shaft;
a cutting member which extends from the cutting head;
an attachment mounted on the string trimmer; and
the attachment being pivotally mounted on, the cuffing head by a pair of opposed pivot mechanisms wherein each of the pair of pivot mechanisms comprises a latching mechanism about which the attachment is capable of latchably rotating relative to the cutting head.

* * * * *

UNITED STATES PATENT AND TRADEMARK OFFICE
CERTIFICATE OF CORRECTION

PATENT NO. : 6,665,942 B2
DATED : December 23, 2003
INVENTOR(S) : Andrew Richardson et al.

It is certified that error appears in the above-identified patent and that said Letters Patent is hereby corrected as shown below:

Column 10,
Line 8, "sides" should be -- side --.
Line 14, "flats" should be -- flat --.

Column 11,
Line 46, "rotatable" should be -- rotatably --.
Line 60, "on-one" should be -- on one --.

Column 12,
Line 11, "o n" should be -- on --.
Line 12, "Mechanism" should be -- mechanism --.
Line 38, delete "not".
Line 58, "on, the cuffing" should be -- on the cutting --.

Signed and Sealed this

Fifth Day of October, 2004

JON W. DUDAS
*Director of the United States Patent and Trademark Office*